United States Patent Office 3,186,975
Patented June 1, 1965

3,186,975
SUSPENSION POLYMERIZATION OF STYRENE IN PRESENCE OF AMINO POLYACETIC ACID COMPOUND
Alva F. Harris, Wilbraham, Mass., assignor to Monsanto Company, a corporation of Delaware
No Drawing. Filed Dec. 22, 1960, Ser. No. 77,522
8 Claims. (Cl. 260—93.5)

This invention relates to the suspension polymerization of styrene. More particularly, the invention relates to a method of improving the color of polystyrene prepared by suspension polymerization.

The minimization of yellowness of the polymer is a recognized problem in the suspension polymerization of styrene with water-soluble suspending agents. Although various known techniques present a partial solution to the problem, it is frequently found that the degree of yellowness of bead polystyrene varies unpredictably (e.g., with variations in the source of raw materials for the polymerization recipe) with the result that the polymer may be undesirably yellow, particularly after processing, despite the use of the known techniques designed to minimize yellowness.

One object of this invention is to provide a novel process for the suspension polymerization of styrene.

Another object is to provide a method of improving the color of polystyrene prepared by suspension polymerization in the presence of water-soluble suspending agents.

These and other objects are attained by conducting the suspension polymerization of styrene with a water-soluble suspending agent in the presence of 0.05–200 parts per million, based on the weight of styrene, of an amino polyacetic acid or derivative thereof.

The following examples are given to illustrate the invention. In the preparation of any two polymers designed for comparison of optical properties in these examples, care is taken to use the same source of raw materials, the same type of reaction vessel, etc., to avoid confusion of the results by unknown variables. Quantities mentioned in the examples, unless otherwise specified, are quantities by weight.

EXAMPLE I

Part A

Polystyrene beads are prepared from the following polymerization recipe.

| Component: | Parts |
| --- | --- |
| Water | 212 |
| Styrene | 100 |
| Dicumyl peroxide | 0.10 |
| Sodium chloride | 0.10 |
| Suspending agent [1] | 0.07 |

[1] An acrylic acid-2-ethylhexyl acrylate copolymer containing 95 mol percent of combined acrylic acid and having a specific viscosity of 3.5, measured as a 1% aqueous solution of the copolymer at 25° C.

The sodium chloride and 200 parts of water are charged to a suitable reaction vessel, deoxygenated by boiling, and cooled under nitrogen. The styrene and catalyst are then added, and the reaction mixture is heated with agitation under nitrogen pressure for about 1¼ hours at 125° C. to about 30% conversion of styrene to polymer. At this stage of the polymerization, a solution of the suspending agent in the remainder of the water is added to the reaction vessel. Polymerization is then continued by heating the reaction mixture with agitation at 125° C. for an additional 10¾ hours. An inert atmosphere is maintained throughout the reaction.

The batch is now cooled, adjusted to a pH of 7–7.5 with dilute NaOH, heated at 80–90° C. for 15 minutes, and filtered to dewater the spherical polystyrene beads, which are subsequently washed, dried, and formed into two ⅛″-thick specimens for testing optical properties. One specimen, hereinafter designated as the non-extruded specimen, is formed by compression molding the beads at 170° C.; the other, the extruded specimen, is formed by first extruding the beads at 260° C. and then compression molding at 170° C.

The three-point yellowness of the specimens is determined by measuring their reflectance of light at 700 mu, 500 mu, and 420 mu and calculating the three-point yellowness in accordance with the equation:

$$Y = 2R700 - (R500 + R420)$$

wherein Y represents the three-point yellowness value and R700, R500, and R420 represent the reflectances at 700 mu, 500 mu, and 420 mu, respectively.

The three-point yellowness values of the non-extruded and extruded test specimens of this example are shown in Table I.

Part B

Part A is repeated with the exception that 8 parts per million, based on styrene, of the disodium salt of ethylenediamine tetraacetic acid are charged to the reaction vessel together with the sodium chloride and water. The three-point yellowness values of the non-extruded and extruded test specimens of polystyrene are shown in Table I.

TABLE I

| | Three-point Yellowness | |
| --- | --- | --- |
| | Non-extruded specimen | Extruded specimen |
| Part A | 23.8 | 32.9 |
| Part B | 12.8 | 20.0 |

EXAMPLE II

Part A

Polystyrene beads are prepared from the following polymerization recipe.

| Component: | Parts |
| --- | --- |
| Water | 212 |
| Styrene | 100 |
| Di-t-butyl peroxide | 0.10 |
| Sodium chloride | 0.60 |
| Suspending agent [1] | 0.12 |

[1] A polyvinyl alcohol (86–89% hydrolysis) having a viscosity of 35–45 cps. as a 4% aqueous solution at 20° C.

The procedure is the same as the procedure described in Part A of Example I except that the reaction temperature is 130° C. instead of 125° C. Non-extruded and extruded sepecimens of polystyrene are formed as in Example I. The three-point yellowness values of these test specimens are shown in Table II.

Part B

Part A is repeated with the exception that 8 parts per million, based on styrene, of the trisodium salt of (hydroxyethyl)-ethylenediamine triacetic acid are charged to the reaction vessel together with the sodium chloride and water. The three-point yellowness values of the non-extruded and extruded test specimens are shown in Table II.

TABLE II

|  | Three-point Yellowness ||
| --- | --- | --- |
|  | Non-extruded specimen | Extruded specimen |
| Part A | 14.1 | 24.7 |
| Part B | 7.5 | 17.1 |

EXAMPLE III

Part A

Polystyrene beads are prepared from the following polymerization recipe.

| Component: | Parts |
| --- | --- |
| Water | 107 |
| Styrene | 100 |
| Dicumyl peroxide | 0.10 |
| Sodium chloride | 0.10 |
| Suspending agent [1] | 0.07 |

[1] An acrylic acid-2-ethylhexyl acrylate copolymer containing 95 mol percent of combined acrylic acid and having a specific viscosity of 3.5, measured as a 1% aqueous solution of the copolymer at 25° C.

The procedure is the same as the procedure described in Part A of Example I except that the initial charge to the reaction vessel includes 100 parts of water rather than 200 parts. Table III shows the three-point yellowness of an extruded test specimen, formed as in Example I.

Part B

Part A is repeated with the exception that 100 parts per million, based on styrene, of the pentasodium salt of diethylenetriamine pentaacetic acid are charged to the reaction vessel together with the sodium chloride and water. The three-point yellowness of an extruded test specimen of the polystyrene is shown in Table III.

TABLE III

| | Three-point yellowness |
| --- | --- |
| Part A | 9.8 |
| Part B | 6.5 |

The invention is a method of preparing bead polystyrene by conducting the suspension polymerization of styrene with a water-soluble suspending agent in the presence of 0.05–200 parts per million, based on the weight of styrene, of an amino polyacetic acid or derivative thereof.

Amino polyacetic acids (i.e., compounds containing at least two —$CH_2COOH$ groups bound to a nitrogen atom) utilizable in the practice of the invention include, e.g., aminodiacetic acid, aminotriacetic acid, alkylenepolyamine polyacetic acids such as ethylenediamine diacetic acid, ethylenediamine triacetic acid, (hydroxyethyl) ethylenediamine triacetic acid, ethylenediamine tetraacetic acid, propylenediamine tetraacetic acid, butylenediamine diacetic acid, diethylenetriamine pentaacetic acid, etc., and mixtures thereof.

Amino polyacetic acid derivatives utilizable in the practice of the invention are the alkali metal salts, alkylamine salts, dialkylamine salts, and alkyl esters of the acids. Exemplary of such derivatives are the mono-, di-, tri-, and tetrasodium salts of ethylenediamine tetraacetic acid, the corresponding potassium and lithium salts, the n-butylamine and diethylamine salts of ethylenediamine tetraacetic acid, the n-butyl ester of ethylenediamine tetraacetic acid, etc.

The amino polyacetic acid or derivative thereof is employed in amounts in the range of 0.05–200 parts per million, based on the weight of styrene. Ordinarily, about 0.1–10 parts per million are sufficient to accomplish an improvement in the color of the polymer, and use of amounts in excess of this range does not seem to improve the color further. However, in some cases, larger amounts of amino polyacetic acid are required to effect any improvement in the color of the polymer. Because of this fact and the fact that undue yellowness of a polymer can result unexpectedly from an apparently minor variation in the polymerization process (e.g., a change in the source of a raw material), thus making it difficult to predict exactly how much amino polyacetic acid should be used, it is sometimes desirable to use amounts in the range of 10–200 parts per million, based on the weight of styrene. In any case, amounts of amino polyacetic acid in excess of the amount actually sufficient to effect an improvement in the color of the polymer, although not apparently beneficial except as a precautionary measure, can be used without ill effect within the range of 0.05–200 parts per million.

With the exception of the novel feature of conducting the polymerization in the presence of an amino polyacetic acid compound, the process of the invention is a conventional suspension polymerization process. Thus, styrene is polymerized with agitation in an inert atmosphere in the presence of catalytic amounts of a free radical-generating polymerization initiator such as a peroxy or azo compound, e.g., benzoyl peroxide, di-t-butyl peroxide, dicumyl peroxide, t-butyl peracetate, azoisobutyronitrile, etc., at temperatures in the range of 30–200° C., preferably about 50–150° C., under atmospheric or superatmospheric pressure. The amount of water employed is such that the water/monomer ratio is in the range of 9:1 to 2:3, usually 3:1 to 1:1. Minor amounts of an inorganic salt are frequently incorporated to improve suspension stability.

The suspending agent can be any of the water-soluble organic materials conventionally employed as suspending agents in bead polymerization processes, e.g., polyvinyl alcohol, sulfonated polystyrenes, acrylic acid polymers and copolymers, cellulose ethers, etc. It is usually employed in amounts of 0.005–2%, preferably 0.01–0.5%, based on the weight of water in the reaction mixture. It can be included in the initial polymerization recipe or, alternatively, can be added to the reaction mixture during polymerization, e.g., at 20–30% conversion of monomer to polymer.

According to a preferred embodiment of the invention, the suspending agent is a copolymer of 93.5–98.5 mol percent of acrylic acid and/or methacrylic acid and 6.5–1.5 mol percent of 2-ethylhexyl acrylate and/or 2-ethylhexyl methacrylate. Such copolymeric suspending agents are described in U.S. 2,945,013, issued July 12, 1960.

Although the invention has been described with particular emphasis on the homopolymerization of styrene, it is also applicable to the copolymerization of styrene with up to an equal amount by weight of one or more copolymerizable monomers, e.g., conjugated dienes such as butadiene, isoprene, etc., acrylic-type compounds such as acrylonitrile, methacrylonitrile, methyl acrylate, methyl methacrylate, butyl acrylate, butyl methacrylate, etc., monovinylidene aromatic hydrocarbons such as alpha-methylstyrene, etc.

If desired, the polymerization can be conducted in the presence of additives such as preformed polymers, e.g., natural and synthetic rubbers, antioxidants, stabilizers, fillers, colorants, etc.

The invention is particularly advantageous in that conducting the suspension polymerization of styrene in the presence of amino polyacetic acid compounds can effect an improvement in the color of bead polystyrene or can serve as a precautionary measure to prevent unexpected discoloration of the polymer in processes which normally lead to the formation of bead polystyrene having good color.

It is obvious that many variations can be made in the products and processes set forth above without departing from the spirit and scope of the invention.

What is claimed is:

1. In a process for polymerizing styrene with agitation in suspension in an aqueous medium containing a water-soluble suspending agent and a free radical-generating polymerization initiator at 30–200° C., the improvement which comprises conducting the polymerization in the presence of 0.05–200 parts per million, based on the weight of styrene, of an amino polyacetic acid compound of the group consisting of amino polyacetic acids containing at least two —$CH_2COOH$ groups bound to a nitrogen atom and the alkali metal salts, alkylamine salts, dialkylamine salts, and alkyl esters of said amino polyacetic acids; the alkyl radicals of said alkylamine, dialkylamine, and alkyl derivatives containing up to 4 carbon atoms.

2. A process as in claim 1 wherein the amino polyacetic acid compound is an alkylenepolyamine polyacetic acid.

3. A process as in claim 1 wherein the amino polyacetic acid compound is an alkali metal salt of an alkylenepolyamine polyacetic acid.

4. A process as in claim 3 wherein the amino polyacetic acid compound is the disodium salt of ethylenediamine tetraacetic acid.

5. A process as in claim 3 wherein the amino polyacetic acid compound is the trisodium salt of (hydroxyethyl)ethylenediamine triacetic acid.

6. A process as in claim 3 wherein the amino polyacetic acid compound is the pentasodium salt of diethylenetriamine pentaacetic acid.

7. A process as in claim 1 wherein the water-soluble suspending agent is polyvinyl alcohol.

8. A process as in claim 1 wherein the water-soluble suspending agent is a copolymer of 93.5–98.5 mol percent of an unsaturated acid of the group consisting of acrylic acid, methacrylic acid, and mixtures thereof and 6.5–1.5 mol percent of an unsaturated ester of the group consisting of 2-ethylhexyl acrylate, 2-ethylhexyl methacrylate, and mixtures thereof.

References Cited by the Examiner

UNITED STATES PATENTS

| | | | |
|---|---|---|---|
| 2,558,728 | 7/51 | Britton et al. | 260—45.85 |
| 2,697,700 | 12/54 | Uraneck et al. | 260—93.5 |
| 2,857,368 | 10/58 | Ingraham et al. | 260—92.8 |
| 2,878,200 | 3/59 | Holmes et al. | 260—29.6 |
| 2,933,467 | 4/60 | Borunsky | 260—93.5 |
| 3,003,993 | 10/61 | Wooten | 260—45.85 |
| 3,070,588 | 12/62 | Klink et al. | 260—78 |

OTHER REFERENCES

Schildknecht, C. E.: Polymer Processes, Interscience Publishers Inc., N.Y. (pp. 69–174).

JOSEPH L. SCHOFER, *Primary Examiner*.

H. N. BURSTEIN, LEON J. BERCOVITZ, *Examiners*.